United States Patent Office 3,444,311
Patented May 13, 1969

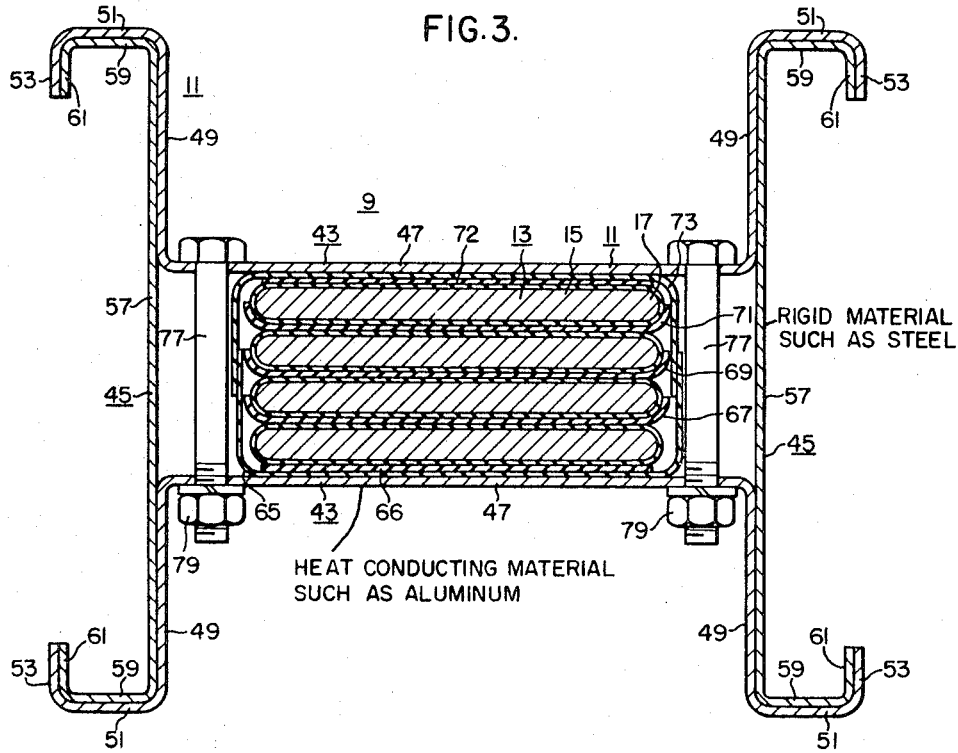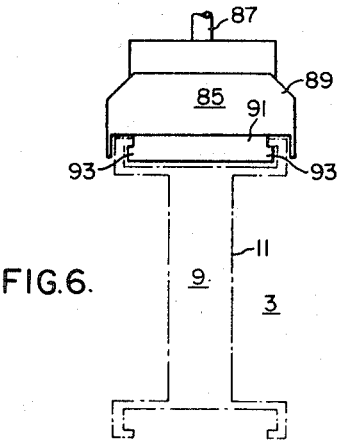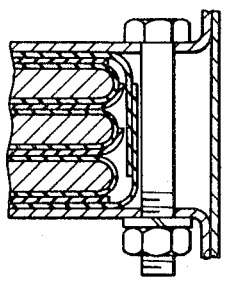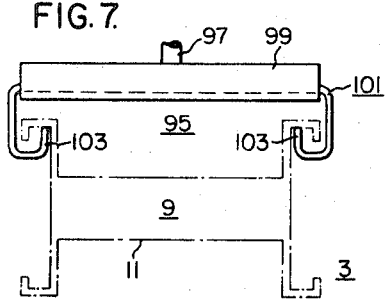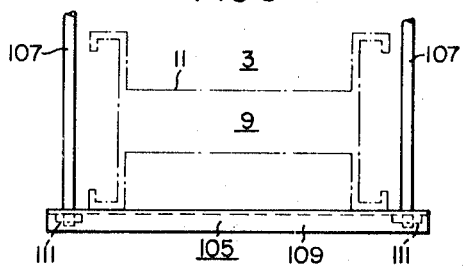

1

3,444,311
BUS DUCT
Charles L. Weimer, Beaver Falls, and Bill M. Shannon, Rochester, Pa., assignors to Westinghouse Electric Corporation, Pittsburgh, Pa., a corporation of Pennsylvania
Filed June 24, 1966, Ser. No. 560,129
Int. Cl. H01b 7/34; H02g 3/28
U.S. Cl. 174—68                                    10 Claims This invention relates generally to bus duct and more particularly to a totally enclosed type of bus duct.

For certain bus duct installations, it is desirable to provide means for dissipating heat from the bus bars without providing openings or air vents in the housing structure. The housing structure should also be structurally sound and able to support the bus duct that may be suspended in different orientations and by different types of hanger structures.

Accordingly, an object of this invention is to provide an improved section bus duct comprising a plurality of bus bars and a housing structure constructed and arranged to dissipate heat through the housing structure and to provide a structurally sound structure that can be supported in a plurality of different orientations by means of a plurality of different types of hanger structures.

Another object of this invention is to provide an improved totally-enclosed type of bus duct.

A general object of this invention is to provide an improved bus duct structure that is economical to manufacture and efficient in operation.

These and other objects of this invention will become more apparent upon consideration of the following detailed description when taken in conjunction with the accompanying drawings.

In said drawings:

FIG. 3 is a sectional view, with parts broken away, taken generally along the line III—III of FIG. 1;

FIG. 5 is a part of a sectional view similar to FIG. 3 of the bus duct section seen in FIG. 4; and FIGS. 6, 7 and 8 are views illustrating different ways of suspending the bus duct sections of FIGS. 1–5.

Figure 1:
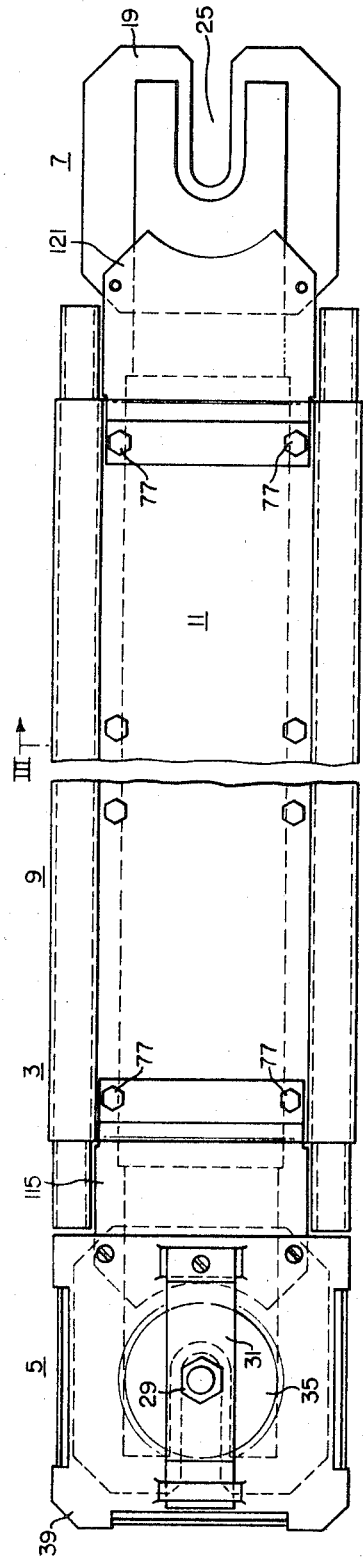
FIGURE 1 is a top plan view, with parts broken away, of a section of bus duct constructed in accordance with principles of this invention.
Figure 2:
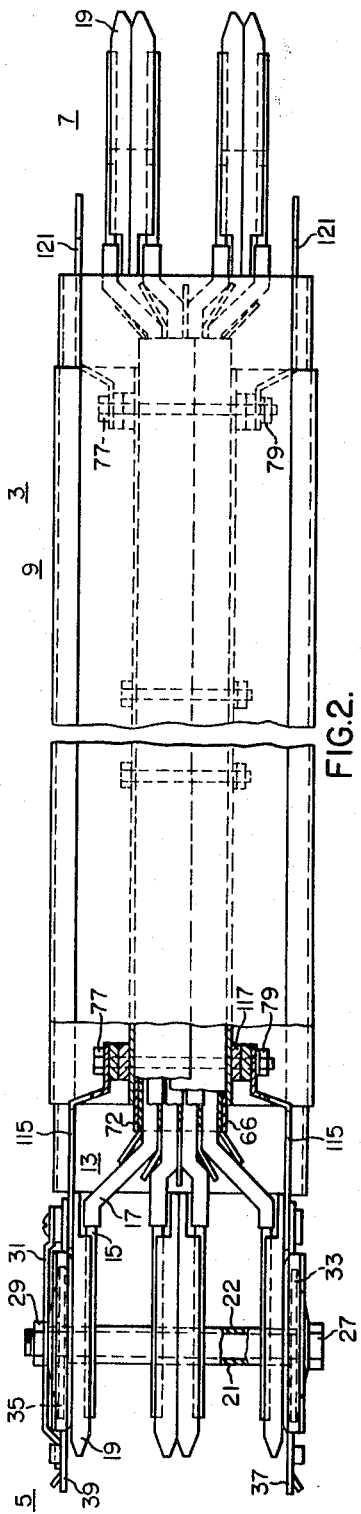
FIG. 2 is a side view, with parts broken away and with parts shown in section, of the bus duct section seen in FIG. 1.

Referring to the drawings, there is shown in FIGS. 1 and 2 an elongated section 3 of bus duct. The section 3 comprises a first connecting-end part 5 at one end thereof, a second connecting-end part 7 at the other end thereof and a main body part 9 intermediate the connecting-end parts 5 and 7. The section 3 comprises a housing structure 11 and a set of four bus bars 13 supported in the housing structure 11. As can be seen in FIG. 2, the bus bars 13 are sandwiched together in a compact relationship at the main body part 9 of the section, and they are offset at the opposite ends 5, 7 of the section to enable connection of the section to a similar section. Each of the bus bars 13 comprises a conducting bar 15 and an insulating sleeve 17 supported on the conducting bar 15. As can be seen in FIG. 2, each insulating sleeve 17 terminates short of the opposite ends of each bus bar 15 to provide uninsulated end portions to permit connection

2 of the bus bars to bus bars of a similar section in an overlapping relationship. A plurality of rigid insulating members 19 are supported at the ends 15 of the bus bars. A bolt 21 and insulating tube 22 extend through openings in the bus bars 15 and insulators 19 at the connecting-end part 5. The insulators 19 and bus bars 15 are provided with aligned slots 25 (FIG. 1) therein at the other connecting-end part 7 of the section. The connecting-end part 7 of one section can be moved into a connecting position cooperating with the connecting-end part 5 of a similar section with the bars and insulators at the connecting-end part 7 straddling the bolt 21 and insulating tube 22, and with each bus bar of one section being in an over-lapping relationship with a bus bar of the other section. When the sections are in the connecting position, the bolt-head 27 can be rotated while a nut 29 is held against rotation by means of a lock member 31. This operation draws a pair of spring washer members 33 and 35 toward each other to thereby draw the opposite housing parts 37 and 39 toward each other to thereby squeeze the generally rigid insulators 19 and bus bars 15 together to physically and electrically connect the bus bars of the sections together. The means for connecting the similar sections together is more specifically described in the co-pending patent application of Charles L. Weimer and Bill M. Shannon, Ser. No. 560,277, filed June 24, 1966, and assigned to the assignee of the instant application. Thus, only a brief description of the connecting means is given herein.

The construction of the main-body part 9 of the bus duct section 3 will be best understood with reference to FIG. 3. As can be seen in FIG. 3, the bus bars 13 are generally flat members supported in a stacked mutually flatwise face-to-face relationship. The housing structure 11 comprises a first pair of opposite housing members 43 and a second pair of opposite housing members 45. Each of the housing members 43 is a generally U-shaped structure comprising a flat planar bight part 47 and a pair of flat planar opposite main leg parts 49 extending upward from the bight part 47 generally normal to the plane of the bight part 47. Each of the main leg parts 49 is bent-over near the upper end thereof to form a flat planar outer leg part 51 extending outwardly from the part 49, and the parts 51 are bent-over to provide downwardly extending end parts 53 that extend downwardly parallel to the main leg parts 49. As can be seen in FIG. 3, each of the housing members 43 is an integral sheet-metal member bent-over to form the parts 47, 49, 51 and 53.

Each of the members 45 of the second pair of opposite housing members 45, at the main-body part 9 of the bus duct section, is a generally C-shaped sheet metal member. Each of the members 45 comprises a flat planar bight part 57 bent-over at the opposite ends thereof to provide flat planar main leg parts 59 extending normal to the plane of the bight part 57. The main leg parts 59 are bent-over to provide flat planar end parts 61 that extend inwardly toward each other parallel to the plane of the bight part 57.

As can be seen in FIG. 3 the housing members 43 and 45 form four generally U-shaped channel parts at the four corners of an imaginary rectangle with each generally U-shaped channel part comprising a part of one of the housing members 43 and a part of one of the housing members 45 which parts are in face-to-face engagement.

The opposite housing members 43 are aluminum members for effective heat dissipation and the opposite housing members 45 are steel members for increased structural strength.

During assembly of the bus duct section the lower housing member 43 is first set on a suitable support and a stiff generally U-shaped fiber insulating member 65 is placed on the bight portion 47 of the lower member 43. A stiff insulating sheet 66 is then placed on the insulating member 65. The lower bus bar 13 is then set on top of the member 66. A second stiff fiber insulating member 67 is set on the lower bus bar 13, and the second bus bar is set on top of the insulating member 67. A third stiff fiber insulating member 69 is set on the second bus bar and a third bus bar is set on the insulating member 69. A fourth stiff fiber insulating member 71 is set on top of the third bus bar and the fourth bus bar is set on top of the insulating member 71. A stiff insulating sheet 72 is placed on top of the fourth bus bar. A top inverted generally U-shaped stiff insulating member 73 is set over the insulating sheet 72. Thereafter, the opposite housing members 45 are set in position and the top housing member 43 is moved into the position seen in FIG. 3. A plurality of pairs of bolt members 77 are then passed through suitable openings in the opposite housing members 43, and nut members 79 are tightened onto the bolt members 77 drawing the housing members 43 toward each other to tightly sandwich the bus bars 13 and insulating members 65, 66, 67, 69, 71, 72 and 73 between the bight portions 47 of the members in a compact relationship. The insulating 43 members 65, 66, 67, 69, 71, 72 and 73 extend the length of the main-body part 9 of the bus duct section. The dimensions of the bus bars 13, insulators 65, 66, 67, 69, 71, 72, 73, opposite housing members 43 and opposite housing members 45 are such that when the upper housing member 43 is set into place there is a slight clearance between the outer leg parts 51 of the upper housing member 43 and the main leg parts 59 of the housing members 45. This slight clearance is taken up as the bolts 77 and nuts 79 are tightened, squeezing the insulation 17 around the bus bars and bending and shaping the aluminum members 43 slightly to provide a frictional engagement between the housing members 43 and the housing members 45. In order to provide additional protection against the possibility of having the opposite housing members 45 slide longitudinally in their nested relationship within the opposite housing members 43, screws are secured to the parts 51, 59 of the members 45, 43 at spaced intervals along the length of the section. With the bight portions 47 of the housing members 43 drawn together toward the bus bars 13, heat is conducted through the insulators and bus bars 13 to the aluminum housing members 43. The surfaces of the parts 47, 49, 51 and 53 of the aluminum members 43 provide large surface areas for dissipation of heat into the surrounding air. The aluminum members 43 close off two opposite sides of the set of the bus bars 13 and the steel members 45 close off the other two opposite sides to completely enclose the bus bars 13 at the main-body part 9 of the bus duct section. The steel housing members 45 also serve to provide structural strength providing support for the aluminum heat-dissipating housing parts and providing support to enable the section of bus duct to be suspended in different orientations by means of different types of hanger structures.

Referring to FIGS. 1 and 2, it will be noted that at the connecting-end part 5 of the bus duct section a pair of housing members 115 are suitably secured to the main-body part 9 of the bus duct section by means of two of the bolts 77. At the other connecting-end part 7 two housing parts 121 are secured to the main-body part 9 of the bus duct section by means of two of the bolts 77. The housing parts 115 and 121 cooperate with other housing parts (not shown) to enclose the off-set bus bars at the connections in a manner more specifically described in the above-mentioned copending patent application of Charles L. Weimer and Bill M. Shannon.

Different ways of suspending the bus duct are illustrated in FIGS. 6–8.

Referring to FIG. 6, a hanger member 85 comprises a rod 87, an upper support structure 89 that is connected to the rod 87 and a lower hanger part 91 that is connected to the support structure 89. The lower hanger part 91 comprises two shoulder portions 93 that engage under the opposite end parts 61 (FIG. 3) of the steel upper (FIG. 6) housing member 45 to provide a suspending force on the upper housing member 45, which force operates, through the parts 61 of the upper housing member 45, on the parts 53 of the two aluminum housing members 43 to provide a suspending force on the opposite housing members 43 to thereby suspend the bus duct section. The bus bars 13 are clamped tightly between the supported housing members 43, and a run of the bus duct sections are supported at the installation by means of a plurality of hangers 85 in the manner disclosed in FIG. 6.

Referring to FIG. 7, a hanger structure 95 comprises a rod 97 that supports a channel member 99 that in turn supports a supporting member 101. The supporting member 101 comprises a pair of hook members 103 that engage under the main leg parts 59 (FIG. 3) of the opposite steel housing members 45. The suspending force on the parts 59 is transmitted to the upper outer leg parts 51 of the upper (FIG. 7) aluminum housing member 43 to thereby suspend the upper housing member 43. The suspending force on the upper housing member 43 operates through the bolts 47 and the nuts 79 to suspend the lower housing member 43 to thereby support the bus bars 13 that rest on the lower housing member 43. The suspending force on the parts 59 of the opposite housing members 45 also operates against the main leg parts 49 of the lower housing member 43, and the securing screws (not shown) that are used to secure the parts 59 of the members 45 with the parts 51 of the lower housing member 43 to provide additional support for the lower housing member 43. A run of bus duct sections are supported at the installation by means of a plurality of suspending hangers 95 in the manner disclosed in FIG. 7.

Referring to FIG. 8, a suspending hanger 105 comprises a pair of rods 107 and a lower channel member 109 supported to the rods 107 by means of nuts 111 that are secured to the lower ends of the rods 107. The member 109 serves as a platform and the bus duct section 3 rests on the platform 109. At this installation, the outer leg parts 51 (FIG. 3) of the lower (FIG. 8) aluminum housing member 43 rest on the platform 109 to support the bus bars which rest on the lower housing member 43; the lower parts 59 of the opposite steel housing members 45 rest on the parts 51 of the lower housing member 43 to provide support for the opposite housing members 45; the parts 51 of the upper aluminum housing member 43 rest on the parts 59 of the opposite steel housing members 45 to provide support for the upper aluminum housing member 43; and the bolts 77 and nuts 79 operate through the upper aluminum housing member 43 to provide additional support for the part 43 of the lower aluminum housing member 43 and for the bus bars.

In each of FIGS. 6, 7 and 8 the bus duct is shown mounted horizontally. The bus duct can also be mounted vertically in a manner well known in the art by means of suitable hanger structures that can be bolted to the parts 51, 59 of the bus duct housing.

It can be understood that at each of the above-described installations the friction between engaging parts, the securing means securing the parts together and the shapes and arrangement of the parts all cooperate to provide a structurally strong bus duct for supporting the weight of the bus duct at the installations and for also withstanding the forces that may act on the bus duct during short circuit conditions.

At the installations a plurality of similar bus duct sections 3 are connected and supported as a run of bus duct in order to provide power distribution as required at the installation.

Figure 4:
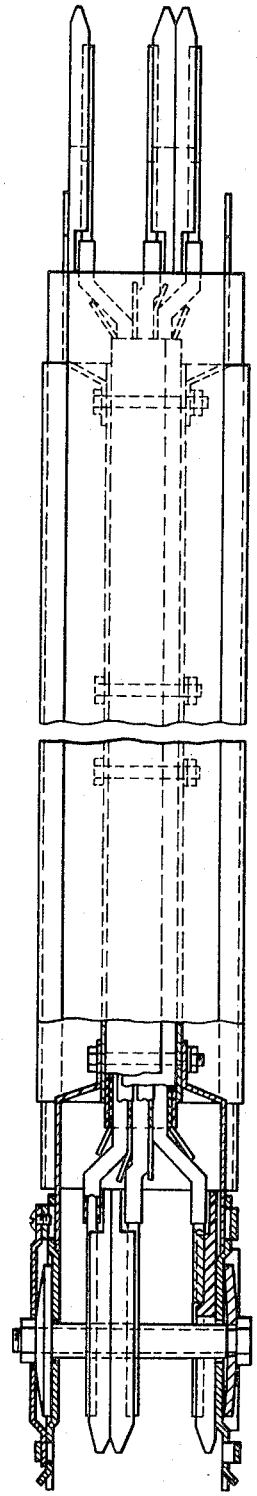
FIG. 4 is a view similar to FIG. 2 of a three-bar section of bus duct.

A similar section of bus duct is disclosed in FIGS. 4 and 5 wherein there are three bus bars for a three-wire system as opposed to the four bus bars of the four-wire system disclosed in FIGS. 1, 2 and 3. For clarity, reference characters are not applied in FIGS. 4 and 5 since it can be clearly seen that the construction is like that of FIGS. 1–3. It is noted that one of the insulating fiber members is left out in FIG. 5 since one of the bus bars is left out and that the off-set end parts of the bus bars are off-set differently for connection to bus bars of a similar section. The connection between sections of the type disclosed in FIGS. 4 and 5 is more specifically described in the above-mentioned patent application of Charles L. Weimer and Bill M. Shannon.

From the foregoing, it can be understood that there is provided by this invention improved bus duct comprising a plurality of bus bars and a housing structure constructed and arranged to dissipate heat through the housing structure and to provide a structurally sound structure that can be supported in a plurality of different orientations by means of a plurality of different types of hanger structures.

Since numerous changes may be made in the above-described construction, and because different embodiments of the invention may be made without departing from the spirit and scope of the invention, it is intended that all matter contained in the foregoing description or shown in the accompanying drawings shall be interpreted as illustrative and not in a limiting sense.

We claim as our invention:

1. A section of bus duct comprising a housing, a set of a plurality of generally flat bus bars supported in said housing, said section comprising a main-body part intermediate the ends thereof,
   said bus bars of said set at said main-body part of said section being positioned in a stacked mutually flatwise face-to-face relationship,
   said housing at said main-body part of said section comprising a main-body part housing construction, said main-body part housing construction comprising a first pair of oppositely disposed housing members and a second pair of oppositely disposed housing members,
   each housing member of said first pair of housing members comprising a generally U-shaped member formed with the opposite main leg parts thereof bent-over to extend outward from the general U-shape construction, securing means drawing said first pair of housing members toward each other with the back faces of the bight parts of said first pair of housing members being drawn toward the flat outer faces of the outer bus bars of said set of stacked bus bars to mount said set of stacked bus bars in a compact sandwiched relationship between said first pair of housing members, and said second pair of housing members being connected to said first pair of housing members.

2. A section of bus duct according to claim 1, each housing member of said first and second pair of housing members comprising a sheet-metal member, said first and second pair of housing members cooperating to form four generally U-shaped channel parts at the four corners of an imaginary rectangle, each of said four generally U-shaped channel parts comprising a part of a member of said first pair of housing members and a part of a member of said second pair of housing members which parts are in face-to-face engagement.

3. A section of bus duct according to claim 2, said first pair of housing members being members of a material selected from the group of aluminum and base alloys of aluminum, said second pair of housing members being members of steel.

4. A section of bus duct according to claim 1, each housing member of said first pair of housing members comprising a generally U-shaped member formed with the bight part thereof being generally planar and the opposite main leg parts thereof being generally planar and extending along planes generally normal to the plane of the bight part thereof and with the main leg parts thereof being bent-over first outwardly to form outer leg parts and then backwardly toward the plane of the bight part thereof to form end leg parts, and each housing member of said second pair of housing members being in a nested relationship with one main leg part outer leg part and end leg part of each of said housing members of said first pair of housing members.

5. A section of bus duct according to claim 4, said second pair of housing members being mechanically rigid members, said first pair of housing members being metallic members for dissipating heat generated in said bus bars.

6. A section of bus duct according to claim 4, said second pair of housing members being generally C-shaped members of steel, and said first pair of housing members being members of a material selected from the group of aluminum and base alloys of aluminum.

7. A section of bus duct according to claim 1, each housing member of said first pair of housing members comprising a generally U-shaped member formed with a generally planar bight part and generally planar opposite main leg parts extending normal to the plane of the bight part which main leg parts are bent-over outwardly to provide generally planar outer leg parts extending outwardly generally parallel to the plane of the bight part and which outer leg parts are bent-over to provide generally planar end leg parts extending backward along planes generally parallel to the planes of the main leg parts which end leg parts terminate short of the plane of the bight part, each housing member of said second pair of housing members being in a nested relationship with one main leg part outer leg part and end leg part of each housing member of said first pair of housing members, said housing members of said second pair of housing members being mechanically rigid members, and said first pair of housing members being metallic members for dissipating heat generated in said bus bars.

8. A section of bus duct in accordance with claim 7, said second pair of housing members being steel members, and said first pair of housing members being members of metal selected from the group of aluminum and base alloys of aluminum.

9. A section of bus duct according to claim 1, each housing member of said second pair of housing members comprising a generally U-shaped member comprising a bight part and a pair of opposite leg parts, means connecting said second pair of housing members to said first pair of housing members with the opposite leg parts of each housing member of said second pair of housing members engaging two main leg parts of the two housing members of said first pair of housing members in abutting face-to-face relationship and with the bight parts of said second pair of housing members serving as opposite side walls of said housing, said second pair of housing members being rigid members, and said first pair of housing members being metallic members for dissipating heat generated in said bus bars.

10. A section of bus duct according to claim 1, said bight parts of said first pair of housing members serving as a first pair of opposite side walls of said housing, each housing member of said second pair of housing members comprising a generally U-shaped member comprising a bight part and a pair of opposite leg parts, means connecting said second pair of housing members to said first pair of housing members with the bight parts of said second pair of housing members serving as a second pair of opposite side walls of said housing, each housing member of said second pair of housing members being positioned between the main leg parts of the two housing members of said first pair of housing members with each leg part of each housing member of said second pair of housing members engaging the associated main leg part of said first pair of housing members in an abutting face-to-face relationship, said first pair of housing members being members of a material selected from the group of aluminum and base alloys of aluminum, and said second pair of housing members being members of steel.

References Cited

UNITED STATES PATENTS 2,407,142 9/1946 Cole et al.
3,072,736 1/1963 Wallace.

DARRELL L. CLAY, *Primary Examiner.*

U.S. Cl. X.R.

174—88, 99